March 29, 1927. Re. 16,581
M. R. HULL
AUTOMOBILE TOP
Original Filed March 29, 1917
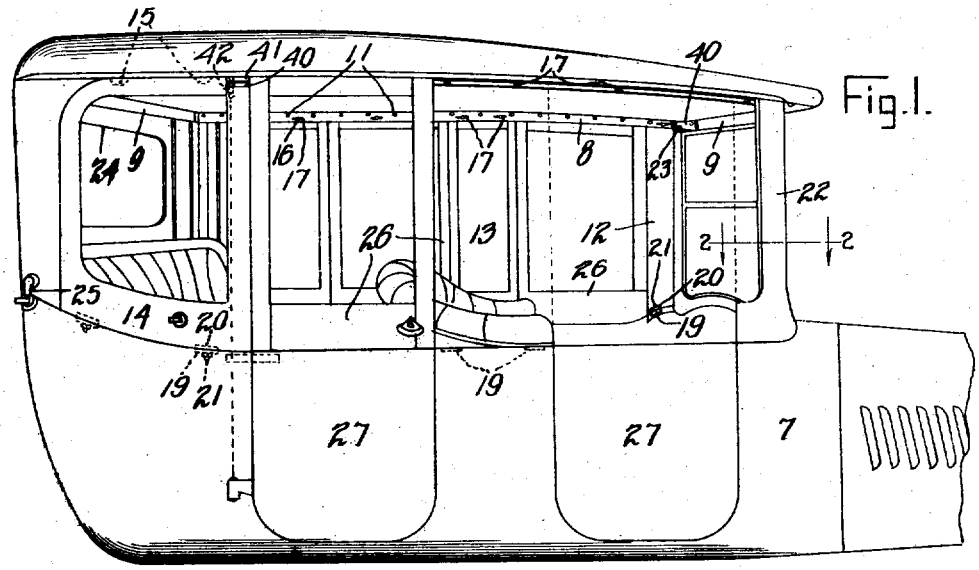
Fig. 1.
Fig. 4
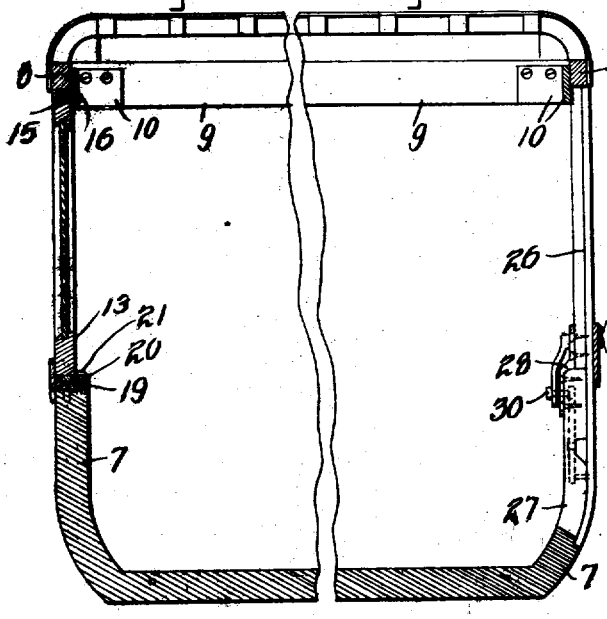
Fig. 5.
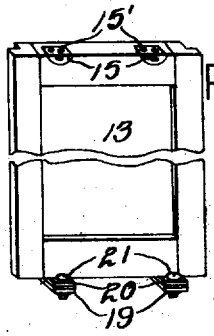
Fig. 6.
Fig. 3.
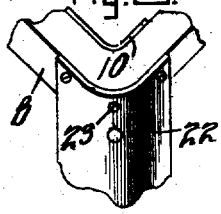
Fig. 2.
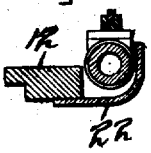
Inventor
Matthew R. Hull
By E. E. Bradford
Attorney Reissued Mar. 29, 1927. Re. 16,581

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION OF INDIANA.

AUTOMOBILE TOP.

Original No. 1,425,014, dated August 8, 1922, Serial No. 158,455, filed March 29, 1917. Application for reissue filed December 9, 1922. Serial No. 605,962.

Heretofore it has been common to use dowels or similar insertable members for attaching removable side panels and windows of vehicle tops, necessitating the lifting of the deck for the introduction or removal of said insertable members. This practice has been attended by a less rigid and durable construction which is subject to more looseness and rattle of parts than is acceptable to a public becoming more exacting with education along these lines.

The object of my invention is to add to the rigidity of the deck structure, and to its more permanent attachment to the body, while affording means for the more ready removal and assembly of the inclosing side members of the top, and also to provide for the removal and assembly of said side members without loosening the deck supports or raising the deck more than its elasticity will allow it to be easily sprung.

A further object of my invention is to provide means, of which said removable side members are a part, for so drawing the deck down as to make a close fit against said side members, and of said side members against the body of the vehicle.

I accomplish the above, and other objects which will hereinafter appear, by the mechanism illustrated in the accompanying drawings, in which—

Figure 1 is a perspective view of an automobile body with a demountable top embodying my invention, the removable door and side panels on the near side being here removed back to the rear door. Figure 2 is a section on the line 2—2 through the front post and windshield. Figure 3 is a fragment in perspective of the front corner of the deck-frame and corner plate. Figure 4, is a vertical section through the body and one of the side panels and deck. Figure 5, is a like section through the door on the opposite side of the vehicle, and Figure 6, is a perspective view of a midside panel.

Like characters of reference indicate like parts throughout the several views of the drawings.

The body 7 is of any usual and suitable size and design, such as are usually made by the various automobile manufacturers. The deck is formed of the longitudinal side members 8, 8, and end members 9, 9, which are commonly of wood, with transverse bows supporting a tight roof, all in the usual manner, but extending the full length of the deck on the inside thereof, and around the corners at front and rear, and extending a suitable distance inwardly of said corners to afford a substantial and strong attachment to the end members of the deck frame of the heavy deck reinforcing rails 10, which reinforce and strengthen an inherently frail structure incident to the advisability of maintaining a light weight deck. The said deck reinforcing rails are composed preferably of iron and are fastened at their upper edges by screws 11, to the adjacent frame members 8 and 9. The deck reinforcing rails 10 are wide enough to extend a considerable distance below the frame members 8, to form stops and holding members for front posts 12, side panels 13, and rear side windows 14. The posts and the frames for the panels and windows are of wood, and they are provided with metal screw-sockets 15, to receive bolts 16, which are passed through slots 17, in the straps 10, and are screwed into threaded sockets in the members 15. The metal screw sockets are retained in place by screws 15′ in the manner shown in Figure 6. The openings 17 in the deck reinforcing rails 10, are elongated into slots to afford adjustment within their lengths for the screws in finding the holes in the members 15. The lower ends of the posts, panels and frames, are secured to the body 7, by plates 19 fastened to the body 7 opposite plates 20 fastened to the respective members to be fastened to said body, which plates have registering holes for the passage of bolts 21, by which the plates are united and also by which the said removable members, and the deck to which they have been previously fastened in the manner above described, are drawn down into close contact with the body. This provides a means for closing any crack between the assembled parts of the demountable top and between them and the body, heretofore often occasioned by a springing up or warping of the deck or other parts, and is an important feature of my invention.

Besides the posts 12, the front of the deck is additionally supported by a metal plate 22, longitudinally curved as clearly shown in Figures 2 and 3, for greater strength, but more particularly to lap from side to front and close the corner gap between the windshield post and the post 12, and exclude the outer elements. The windshield post is preferably secured to this plate, on each side, by a bolt 23.

A back member 24, of the demountable top, is preferably built integral with the deck, and is fastened to the body in a secure manner, here shown as by connection through suitable members 25, with the usual cape-top irons with which all automobile bodies are equipped.

The demountable door members 26 are fastened rigidly to the door members 27, of the body, by means of metal straps or plates 28 extending from one door member to the other, to both of which they are fastened by screws, as shown by dotted lines in Figure 5. An outside handle 29, carried by the upper door member, has an inside arm connecting with the knob 30 of the usual inside latch-lever, whereby the door can be unlatched from the outside.

The strap-irons 10 add greatly to the strength and stiffness of the deck, but on account of the long span of the deck between the posts 12 in front, and the back member 24, the deck still has sufficient elasticity to enable it to be sprung up temporarily while assembling the side panels and windows, if necessary. This is easily done by a person lifting up on the deck at the midlengths of the deck sides; and should the deck be too much sprung it is pulled down to proper place by means of the bolts 21, after the removable side members have been fastened to the rails 10, as directed.

The demountable door members have single hinges located at the top, approximately in line with the hinges below and a space 40, for adjustment in closing is provided. The hinge may be provided by means of a strap 41 projecting rearwardly from the upper door and having a hole to engage a pin projecting upwardly from the adjacent post here consisting of the front member of the rear panel 14 and said pin preferably extending into engagement with the side member 8.

While I have here shown and described the best form of my invention now known to me, and which has been thoroughly tried in practical use, it is obvious that many of the details may be varied without departing from the spirit of the invention, and I therefore do not desire to be held strictly or unduly to the forms shown, but what I do claim as new and wish to secure by Letters Patent of the United States, is:

1. In combination with an open vehicle body, a deck provided with narrow longitudinal side members, means at the front and rear ends of the body for supporting the deck a fixed distance above the body, deck reinforcing rails secured to the side members of the deck and extending the length and around the corners of the deck and depending below the lower edges of the deck to form flanges, means for securing said rails to the deck side members, removable windows, panels and door extensions arranged between the lower edges of the deck and the upper edges of the open vehicle body and alined by the depending portions of said deck reinforcing rails, and means for removably securing said windows, panels and deck reinforcing rails together, substantially as set forth.

2. In combination, an open vehicle body, a deck therefor, a detachable upper door section adapted to be secured to the permanent door of the open body, a post in rear of the door and a hinge at an upper corner of the upper door section consisting of an upright pin rigidly secured to the open member in line with the hinges of the permanent door, and a strap rigidly secured to the other member said strap having a vertical opening for the pin whereby the detachable door section may move up and down relatively to said post, substantially as set forth.

3. In combination, an open vehicle body, a deck therefor, a detachable upper door section adapted to be secured to the permanent door of the open body, a post in rear of the door, a hinge connection for the upper door section comprising a fixed vertical pin alined with the hinges of the permanent door, and a strap fixed to the door and pivotally connected to said pin said hinge connection between the post and the upper door section permitting up and down movement of the door section relatively to the post, substantially as set forth.

4. In combination with an open vehicle body, a deck provided with narrow longitudinal side members, means for supporting the deck a fixed distance above the body, deck reinforcing rails secured to the side members of the deck and extending the length and around the corners of the deck and depending below the lower edges of the deck to form flanges, removable windows, panels and door extensions arranged between the lower edges of the deck and the upper edges of the open vehicle body and alined by the depending portions of said deck reinforcing rails, and means for securing said windows, panels and deck reinforcing rails together.

In witness whereof, I have hereunto set my hand at Connersville, Indiana, this 29 day of November, A. D. nineteen hundred and twenty-two.

MATTHEW R. HULL.